Dec. 3, 1946.   N. V. KUEHLMAN ET AL   2,412,158
AIRPLANE LOADING AND SERVICE VEHICLE
Filed Feb. 14, 1944   3 Sheets-Sheet 1
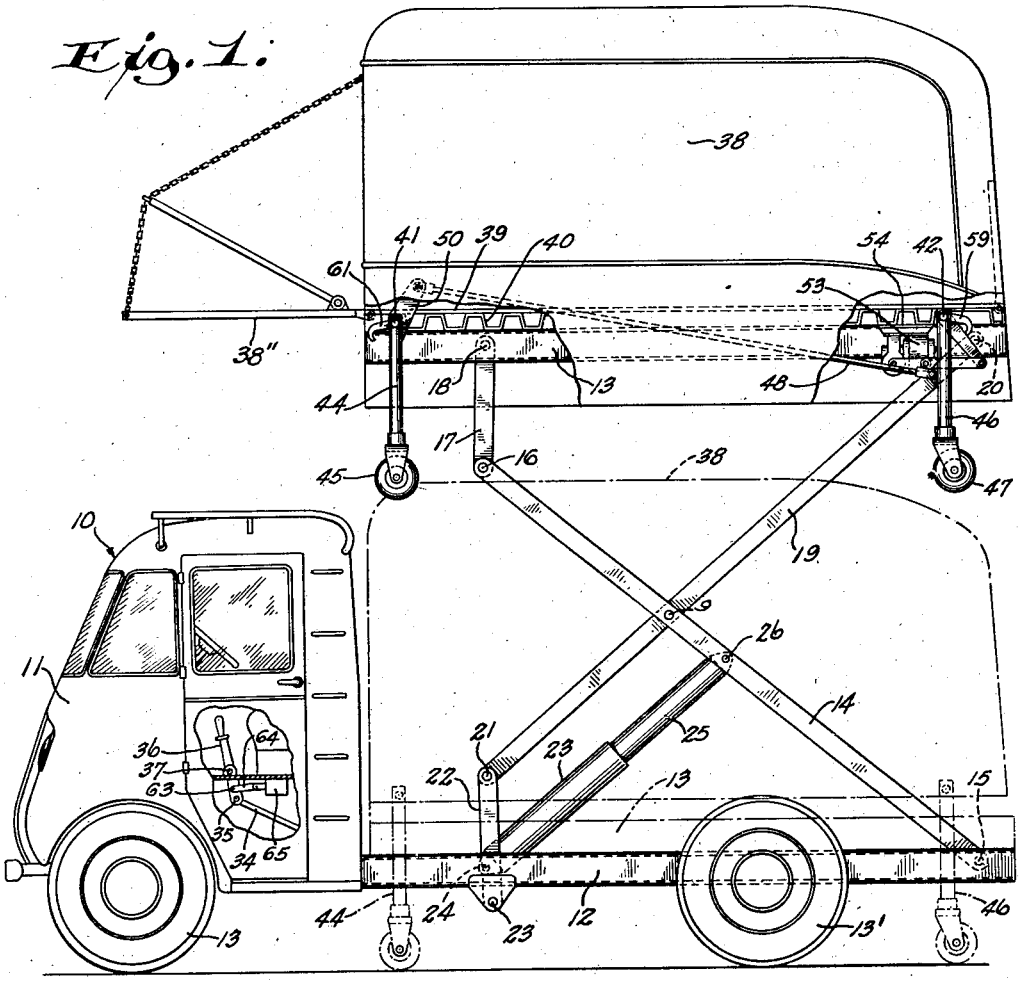
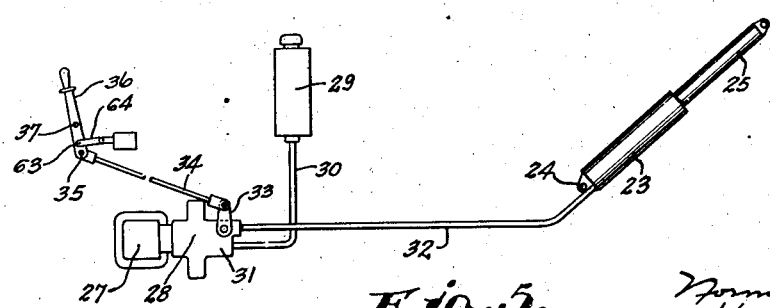
INVENTORS
Norman V. Kuehlman
Henry C. French
BY
Morsell & Morsell
ATTORNEYS

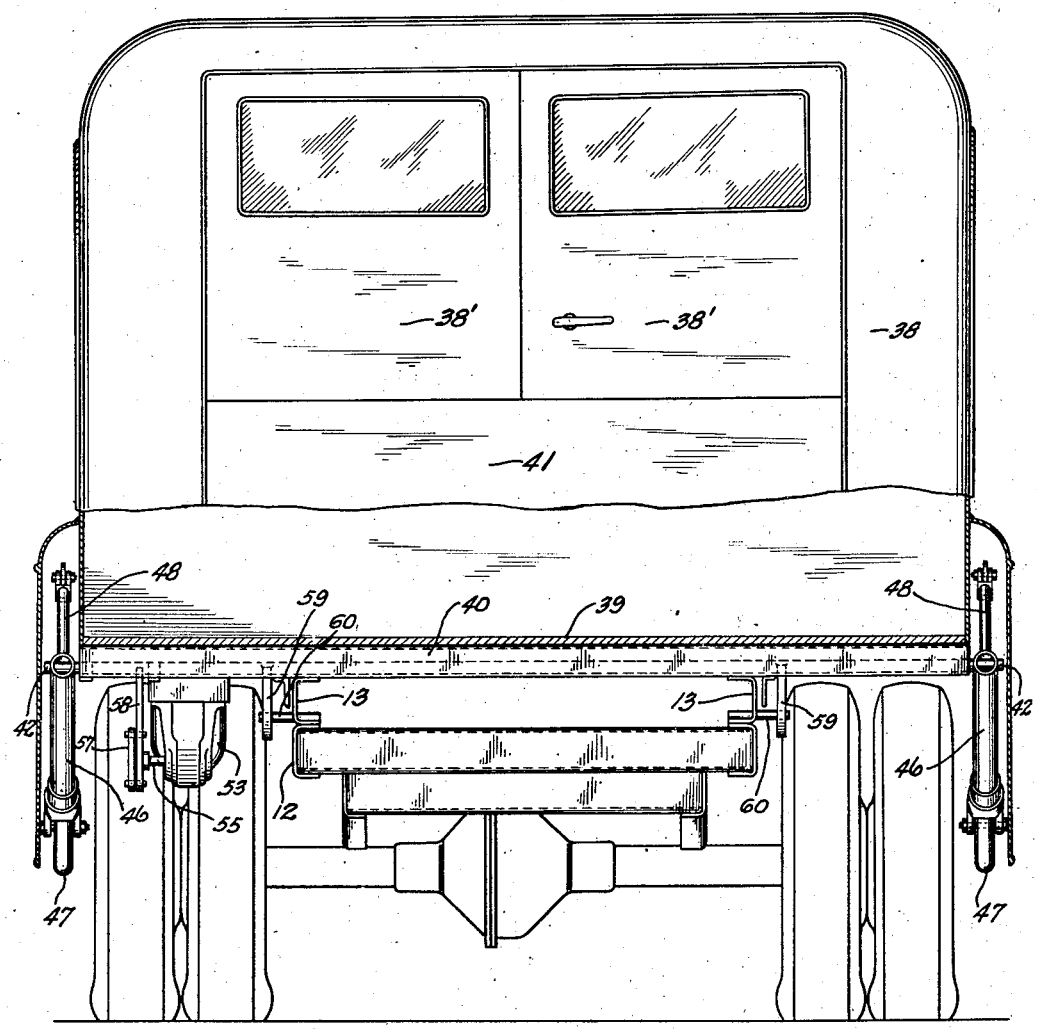

Dec. 3, 1946. N. V. KUEHLMAN ET AL 2,412,158
AIRPLANE LOADING AND SERVICE VEHICLE
Filed Feb. 14, 1944 3 Sheets-Sheet 3
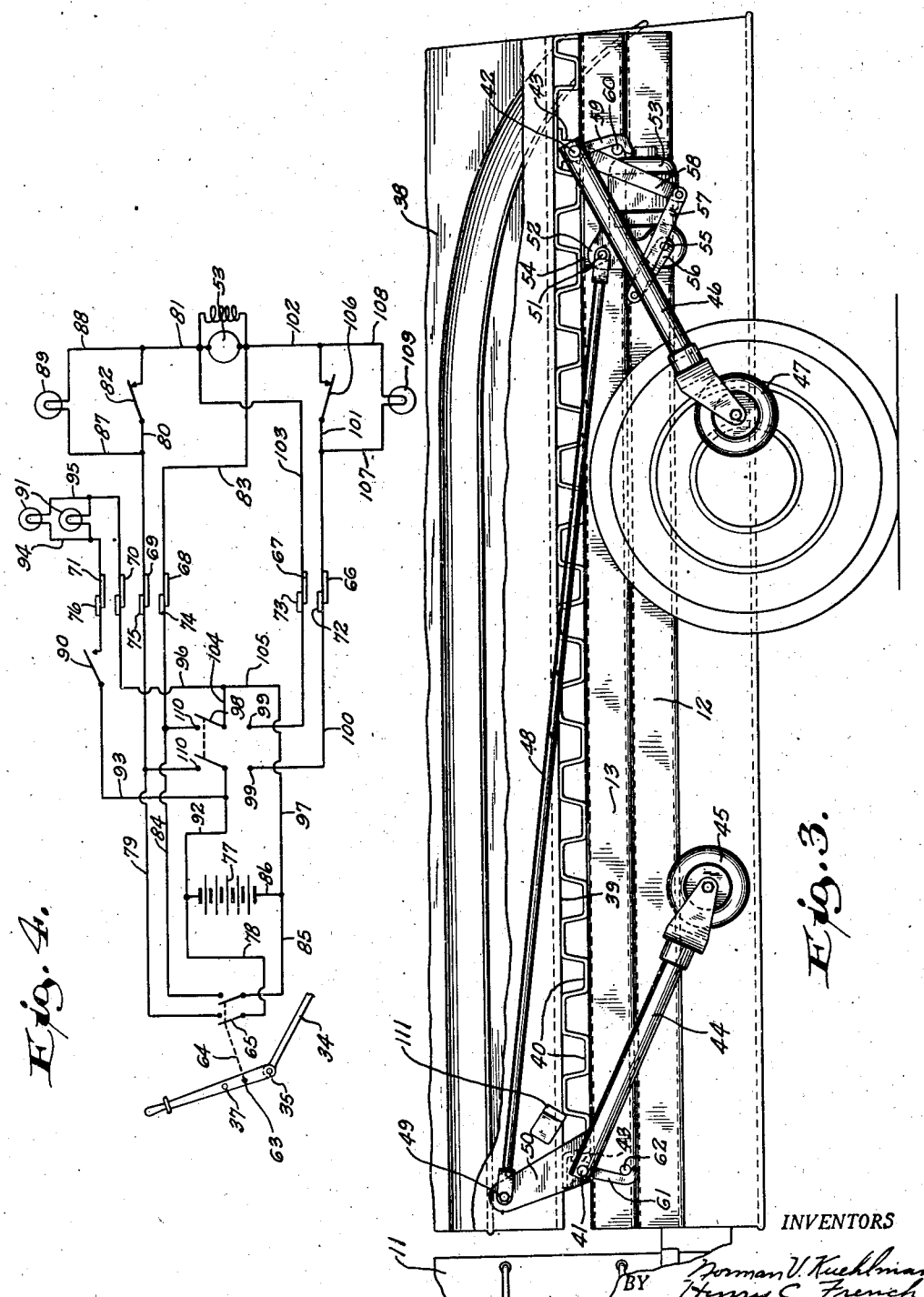

Patented Dec. 3, 1946

2,412,158

UNITED STATES PATENT OFFICE 2,412,158

AIRPLANE LOADING AND SERVICE VEHICLE

Norman V. Kuehlman, Milwaukee, and Henry C. French, Elm Grove, Wis., assignors to The Heil Co., Milwaukee, Wis., a corporation of Wisconsin Application February 14, 1944, Serial No. 522,402

22 Claims. (Cl. 214—75)

This invention relates to improvements in airplane loading and service vehicles.

Trucks having high lift bodies have heretofore been employed for the purpose of loading freight and supplies into transport planes. These trucks, however, have had permanently connected bodies, and a relatively large and costly fleet of trucks was necessary to provide proper loading facilities.

It is a general object of the present invention to provide an improved loading vehicle of the class described wherein novel means is employed to permit quick withdrawal of the truck proper, that is, the frame and cab, from the freight body while the latter is independently supported on its own legs. Thus, a relatively small number of trucks may be used to move and position a relatively large number of bodies, and the cost of this equipment is, therefore, materially reduced.

A further object of the invention is to provide a vehicle, of the class described, having novel means for quickly connecting and locking the freight body to the truck frame.

A further object of the invention is to provide a loading vehicle having a separable freight body equipped with movable legs, and having means for raising and lowering said legs, the construction being such that when the legs are in raised position the freight body is automatically locked to the truck frame, and when the legs are in lowered position the freight body is automatically unlocked.

A further object of the invention is to provide a construction, as above described, having power driven means controlled from the truck cab for raising and lowering the legs of the freight body.

A still further object of the invention is to provide a loading vehicle having a vertically movable power operated high lift frame portion for elevating the freight body and having common means, preferably located in the cab, for controlling the operation of said high lift frame and for controlling the leg raising and body locking mechanism.

A further object of the invention is to provide an arrangement, as above described, wherein the leg-moving mechanism is operated by an electric motor on the freight body and wherein the circuit to said motor is automatically rendered operable when the high lift frame contacts the leg supported freight body during elevating movement of said frame.

A still further object of the invention is to provide a loading vehicle, as above described, having automatically operable electric signals for readily indicating the position of the body legs and the condition of the body locks to the operator of the truck.

With the above and other objects in view, the invention consists of the improved airplane loading and service vehicle and all its parts and combinations as set forth in the claims and all equivalents thereof.

In the accompanying drawings illustrating one complete embodiment of the preferred form of the invention, in which the same reference numerals designate the same parts in all of the views:

Fig. 1 is a side elevational view of the improved vehicle showing the freight body in elevated position, parts being broken away; in this view the dot-and-dash lines illustrate the position of the freight body when it is supported independently by its own legs and in a position to be picked up by the truck;

Fig. 2 is a rear view of the improved vehicle, parts being broken away and shown in section;

Fig. 3 is a fragmentary side elevational view showing the freight body in lowered position and locked to the truck frame, the freight body legs being in raised position;

Fig. 4 is a diagrammatic view illustrating the electrical control system; and

Fig. 5 is a diagrammatic view illustrating the hydraulic system and controls.

Referring more particularly to the drawings, the numeral 10 designates a motor driven truck having a cab portion 11 and having a main rearwardly extending frame portion 12. The truck is supported on four wheels 13 in the usual manner.

Normally supported on the main frame 12 is an auxiliary frame 13. The auxiliary frame comprises spaced longitudinal members as illustrated in Fig. 2, suitably connected by cross members. Levers 14, one on each side of the vehicle, are pivotally connected at their lower ends, as at 15, to the rear portion of the main frame 12. The upper ends of the levers 14 are pivotally connected, as at 16, to the ends of links 17. The other ends of the links 17 are pivotally connected, as at 18, to the auxiliary frame 13. Another pair of levers 19, one on each side of the vehicle, have their upper ends pivotally connected, as at 20, to the auxiliary frame 13 and have their lower ends pivotally connected, as at 21, to links 22. The levers 19 are pivotally connected intermediate their length as at 9 to the levers 14. The other ends of the links 22 are pivotally connected, as at 23, to the main frame 12 of the truck, as is clear from Fig. 1. The above described arrangement constitutes a jack-knife type of high lift mechanism.

An hydraulic device has its cylinder portion 23 pivotally connected to the main frame, as at 24, and has its movable ram portion 25 pivotally connected to the levers 14, as at 26. Referring to Fig. 5 there is suitable power take-off mechanism 27 connected to the truck transmission which drives an oil pump 28. Oil from a reservoir 29 flows through a line 30 leading to the pump and when the valve 31 is in a selected position the oil is forced, under pressure, through the line 32 into the lower end of the hydraulic cylinder 23 to cause raising of the ram 25 and raising of the high lift mechanism to the position of Fig. 1. When the valve operating lever 33 is in another position, lowering of the high lift mechanism and body occurs. The valve operating lever 33 has its upper end pivotally connected to one end of a rod 34 and the other end of the rod extends into the cab 11 and is pivotally connected, as at 35, to the lower end of an operating handle 36. The operating handle is pivoted to the vehicle, as at 37.

A separable freight body 38 has its floor 39 suitably supported on transverse members such as the transverse channels 40, the latter being permanently secured to the lower floor 39. The freight body may be equipped with rear doors 38' and with a movable front door 38'' which can be lowered to the position of Fig. 1 to provide a transfer platform.

Extending transversely of the body 38 below the floor is a front transverse shaft 41 and a rear transverse shaft 42 (see Figs. 2 and 3). These shafts are rotatable in bearings 43 suitably connected to the bottom of the freight body. Rigidly connected to both ends of the shaft 41 are front legs 44 equipped with wheels 45. Rigidly connected to both ends of the rear shaft 42 are rear legs 46 equipped with wheeled casters 47. The casters are capable of swiveling on the lower ends of the legs 46. It is thus apparent that the freight body is equipped with four wheeled supporting legs capable of furnishing independent support for the freight body when the freight body is in the dot-and-dash line position of Fig. 1.

A rod 48 on each side of the freight body is pivotally connected at one end as at 49 with a bracket 50 rigid with the leg 44. The other end of the rod 48 is pivotally connected, as at 51, with a lug 52 on the leg 46. An electrical motor 53, suitably suspended, as at 54, from the bottom of the freight body, drives, through suitable reduction gearing, a shaft 55. The shaft 55 is rigidly connected to one end of a crank arm 56. The other end of the crank arm is pivotally connected to one end of a link 57. The other end of the link 57 is pivotally connected to the lower end of a lever 58. The upper end of the lever 58 is rigidly connected to the transverse shaft 42. Also rigidly connected to the shaft 42, near both ends thereof, are locking hooks 59 which are engageable with locking pins 60. The locking pins 60 project laterally from the auxiliary frame member 13 as shown in Fig. 2. Similar locking hooks 61 are rigidly connected to the forward shaft 41, there being one hook near each end of the shaft. The hooks 61 are cooperable with locking pins 62 projecting laterally from the auxiliary frame 13.

It is apparent from the above, referring to Fig. 3, that when the motor 53 is operated in a direction to rotate the crank shaft 55 clockwise that this will cause the crank arm 56 to act on the link 57 and lever 58 to cause rocking of the shaft 42 in a counter-clockwise direction. This rocking of the shaft 42 will cause swinging of the rear legs 46 from the raised position of Fig. 3 to the lowered position shown by full lines in Fig. 1. At the same time the rods 48 will cause swinging of the front legs 44 from the raised position of Fig. 3 to the lowered position shown by full lines in Fig. 1. It is also apparent that when the legs are in the raised position of Fig. 3 that the hooks 59 and 61 rigidly lock the body to the frame 13. When the legs are in the lowered position, it is apparent that the hooks 59 and 61 are released.

Referring to Figs. 1 and 4 the control lever 36 for the high lift hoist has its lower end pivotally connected, as at 63, with one end of a switch operating rod 64. The switch operating rod 64 operates an electrical switch 65. Assuming now that the freight body 38 is independently supported on its own legs, as indicated by dot-and-dash lines in Fig. 1, and that the truck has been backed into position beneath the freight body 38, then, when the control lever 36 is pulled forward from the position of Fig. 1 it will actuate the valve lever 33 to permit the flow of hydraulic fluid, under pressure, into the hydraulic cylinder 23. This will cause raising of the auxiliary frame member 13 from the dot-and-dash line position of Fig. 1. As soon as the auxiliary frame contacts the transverse channels 40 carried by the bottom of the freight body, it will also cause engagement of the electrical contacts 66, 67, 68, 69, 70 and 71 carried by the freight body with contacts 72, 73, 74, 75 and 76 carried by the truck frame. As soon as the control lever 36 in the cab is pulled toward the operator to operate the hydraulic mechanism, as above described, the control lever will also close the electric switch 65 (see Fig. 4). Current can then flow from one side of the battery 77 through the lines 78, 79, 80 and 81 to one side of the leg-operating motor 53. The switch 82 is a normally closed limit switch. From the other side of the electric motor 53, current flows through lines 83, 84, 85 and 86 back to the other side of the battery 77. This, of course, starts the electric motor operating, to cause raising of the legs 44 and 46 from the dot-and-dash line position of Fig. 1 to the elevated position of Fig. 3, and this raising of the legs occurs while the auxiliary frame 13 is moving the freight body upwardly toward the full line position of Fig. 1. When the legs are fully raised, the hooks 59 and 61 automatically engage the locking pins 60 and 62 to rigidly lock the freight body to the auxiliary frame. When the legs reach their fully raised position the limit switch 82 is automatically opened to break the circuit to the electric motor 53.

Electricity, however, flows around the limit switch 82 through the lines 87 and 88 to cause operation of a signal light 89 which indicates that the legs are in the "up" position. This signal light 89 may be positioned on the freight body near the front thereof so as to be readily visible to the operator through the rear windows of the cab. While the light 89 is operating, there is such resistance in the circuit to the electric motor 53 that the electricity passing through the motor cannot operate the latter.

When the freight body is supported on the auxiliary frame and when the switch 90 is closed the circuit is also completed to dome lights 91 within the freight body 38. This circuit extends from one side of the battery 77 through lines 92, 93 and 94 to one side of the dome lights and through lines 95, 96, 97 and 86 to the other side of the battery.

If the body is in the elevated position of Fig. 1 and if the legs are raised, as is usually the case while the body is elevated, and if it is desired that when the freight body is lowered that it be independently supported on its own legs rather than on the truck, then it is necessary to provide for lowering of the legs 44 and 46 before the freight body reaches the ground. This is accomplished by swinging the manual switch 98 into contact with contacts 99. When the switch 98 is thus moved, current can flow from one side of the battery 77 through lines 92, 100, 101 and 102 to one side of the electric motor 53. From the other side of the electric motor current flows through lines 103, 104, 105, 97 and 86 to the other side of the battery. The switch 98 is a reversing switch and causes the electric motor to operate in a reverse direction when the switch 98 is in engagement with the contacts 99. During this reverse operation of the motor the down limit switch 106 is closed. When the legs are fully down the limit switch 106 automatically opens to break the circuit to the electric motor 53. As soon as the limit switch opens, the current by-passes the switch 106 flowing through lines 107 and 108, and causes lighting of the signal light 109. This signal light 109 indicates to the operator that the legs are down.

Then, when the auxiliary frame is lowered from the full line position of Fig. 1 to the dot-and-dash line position therein, the legs 44 and 46 will be in lowered position to contact the ground, as shown by dot-and-dash lines in Fig. 1, and support the freight body independently. The truck 10 can then be driven out from beneath the body.

If, for any reason, it should be desired to raise the body supporting legs 44 and 46 without operating the high lift mechanism, this may be accomplished by moving the switch 98 into engagement with the contacts 110. Current can then flow from the battery to the motor 53 without passing through the main switch 65 providing the limit switch 82 is closed at the time.

It is apparent from the above that a few trucks can be used for shifting and positioning a plurality of the freight bodies. A truck can drive a body to a desired location and leave it there without waiting for the body to be loaded. In the meantime the truck can take another loaded body to the proper position near an airplane. The empty body may then be returned to a location for loading and the same truck may then leave this body in position on its own supporting legs and pick up another loaded body. Stops 111 limit the movement of the legs to lowered position.

It is also clear that when a truck picks up a freight body that the legs of the freight body are automatically raised and at the same time the freight body is rigidly locked to the frame of the truck. These operations are all automatic and under the control of the operator in the cab of the truck. By means of the signal arrangement the operator is fully informed at all times as to the position of the legs of the freight body. By the novel arrangement a single control lever controls the operation of both the high lift mechanism and the leg raising and body locking mechanism.

Various changes and modifications may be made without departing from the spirit of the invention and all of such changes are contemplated as may come within the scope of the claims.

What we claim is:

1. In a wheeled vehicle having a main rearwardly projecting wheel supported frame portion, an auxiliary frame supported on said main frame, elevating means connecting said auxiliary frame to said main frame for substantial lifting movement with respect thereto, a body positionable over said auxiliary frame and separable therefrom, independent supporting legs movably connected to said body and of a length to independently support said body when the auxiliary frame is therebeneath and in a lowered position, power operated means engaging said elevating means to raise said auxiliary frame into contact with said body to lift the body off of its legs, and means for locking the body to said auxiliary frame.

2. In a wheeled vehicle having a main rearwardly projecting wheel supported frame portion, an auxiliary frame supported on said main frame, elevating means connecting said auxiliary frame to said main frame for substantial lifting movement with respect thereto, a body positionable over said auxiliary frame and separable therefrom, independent supporting legs movably connected to said body and of a length to independently support said body when the auxiliary frame is therebeneath and in a lowered position, power operated means engaging said elevating means to raise said auxiliary frame into contact with said body to lift the body off of its legs, and means for thereafter elevating said body supporting legs.

3. In a wheeled vehicle having a main rearwardly projecting wheel supported frame portion, an auxiliary frame supported on said main frame, elevating means positively connecting said auxiliary frame to said main frame for substantial lifting movement with respect thereto, a body positionable over said auxiliary frame, independent supporting legs movably connected to said body, power operated means engaging said elevating means to raise said auxiliary frame into contact with said body to lift the body off of its legs, and means for thereafter elevating said body supporting legs and for locking the body to said auxiliary frame.

4. In a wheeled vehicle having a main rearwardly projecting wheel supported frame portion, an auxiliary frame supported on said main frame, elevating means permanently connecting said auxiliary frame to said main frame for substantial lifting movement with respect thereto, a body positionable over said auxiliary frame, independent supporting legs movably connected to said body, power operated means engaging said elevating means to raise said auxiliary frame into contact with said body to lift the body off of its legs, movable latch means for locking the body to the auxiliary frame, and a motor for operating said latch means.

5. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to lift the body off of its legs, movable latch means for locking the body to the auxiliary frame, a motor for operating said latch means, and a common control for said body elevating means and said latch operating motor.

6. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to lift the body off of its legs, movable latch means for locking the body to the auxiliary frame, and a motor for operating said latch means and for elevating said body supporting legs.

7. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operating means to raise said auxiliary frame into contact with said body to lift the body off of its legs, movable latch means for locking the body to the auxiliary frame, a motor for operating said latch means and for elevating said body supporting legs, and a common control for the operation of said body elevating means and for said motor.

8. In a wheeled vehicle having a cab and having a main wheel supported frame portion projecting rearwardly from the cab, an auxiliary frame behind the cab and supported on said main frame, means connecting said auxiliary frame to said main frame for elevating movement with respect thereto, a body positionable behind the cab and over said auxiliary frame, independent supporting legs movably connected to said body, power operated means to raise said auxiliary frame into contact with said body to lift the body off of its legs, movable latch means for locking the body to the auxiliary frame, a motor for operating said latch means, and a common control located in the cab for controlling the operation of said body lifting means and said motor.

9. In a wheeled vehicle having a cab and having a main wheel supported frame portion projecting rearwardly from the cab, an auxiliary frame behind the cab and supported on said main frame, means connecting said auxiliary frame to said main frame for elevating movement with respect thereto, a body positionable behind the cab and over said auxiliary frame, independent supporting legs movably connected to said body, power operated means to raise said auxiliary frame into contact with said body to lift the body off of its legs, movable latch means for locking the body to the auxiliary frame, a motor for operating said latch means and for elevating said body supporting legs, and a common control located in the cab for controlling the operation of said body lifting means and motor.

10. In a wheeled vehicle having a main rearwardly projecting wheel supported frame portion, an auxiliary frame supported on said main frame, elevating means positively connecting said auxiliary frame to said main frame for substantial vertical movement with respect thereto, a body positionable over said auxiliary frame, independent supporting legs movably connected to said body, power operated means other than said legs to raise said auxiliary frame into contact with said body to lift the body off of its legs, a latch in connection with at least one of said independent body supporting legs and means cooperable with said latch for locking the body to the auxiliary frame when said legs are in elevated position.

11. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to transfer the load of the body from its legs to said auxiliary frame, a common means including an electric motor on said body for elevating all of said body supporting legs simultaneously, and a control for said motor on the wheeled vehicle.

12. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to transfer the load of the body from its legs to said auxiliary frame, latch means on both sides of the body for locking the body to said auxiliary frame, and a common means for operating said latch means and legs.

13. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to lift the body off of its legs, means including an electric motor on the body for raising and lowering said legs, motor control switch means on the vehicle, an electric circuit between said switch means and motor including a circuit portion on the auxiliary frame and a circuit portion on the body, and electric contacts on the body and auxiliary frame which are engageable when the auxiliary frame engages the body to render said motor circuit operable.

14. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to lift the body off of its legs, movable latch means for locking the body to the auxiliary frame, means including an electric motor on the body for operating said latch means, motor control switch means on the vehicle, an electric circuit between said switch means and motor including a circuit portion on the auxiliary frame and a circuit portion on the body, and electric contacts on the body and auxiliary frame which are engageable when the auxiliary frame engages the body to render said motor circuit operable.

15. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, power operated means to raise said auxiliary frame into contact with said body to lift the body off of its legs, means including an electric motor on the body for raising and lowering said legs, motor control switch means on the vehicle, an electric circuit between said switch means and motor including a circuit portion on the auxiliary frame and a circuit portion on the body, electric contacts on the body and auxiliary frame which are engageable when the auxiliary frame engages the body to render said motor circuit operable, and electric signal means in said electric circuit for indicating the position of the body legs.

16. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, valve controlled hydraulically operated means for raising said auxiliary frame into contact with said body to lift the body off of its legs, movable latches for locking the body to the auxiliary frame, means including an electric motor and a switch therefor for operating said latches, and means including a common manual lever on the vehicle for actuating said hydraulic valve and for actuating said motor switch.

17. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, valve controlled hydraulically operated means for raising said auxiliary frame into contact with said body to lift the body off of its legs, means including an electric motor and a switch therefor for raising said body legs, and means including a common manual lever for actuating said hydraulic valve and motor switch.

18. In a wheeled vehicle having a main rearwardly projecting wheel supported frame portion, an auxiliary frame supported on said main frame, means connecting said auxiliary frame to said main frame for elevating movement with respect thereto, a body positionable over said auxiliary frame, independent supporting legs movably connected to said body, valve controlled hydraulically operated means for raising said auxiliary frame into contact with said body to lift the body off of its legs, movable latches for locking the body to the auxiliary frame, means including an electric motor and a switch therefor for moving said body legs to raised position and for moving said latches to locking position, and means including a common manual lever for actuating said hydraulic valve and for actuating said motor switch.

19. In a wheeled vehicle having a main rearwardly projecting wheel supported frame portion, an auxiliary frame vertically movably mounted on the main frame, means for imparting vertical movements to the auxiliary frame, a body positionable over said auxiliary frame, independent, ground-engaging legs movably connected to said body, upward movement of the auxiliary frame causing it to engage the body to lift it off of its legs, means for locking the body to the auxiliary frame, and a common control member for operating said frame locking means and for moving said legs.

20. In a wheeled vehicle having a main rearwardly projecting wheel supported frame portion, a separable body, legs movably connected to said separable body for movement into and out of body supporting position and of such length that the rearwardly projecting wheel supported frame portion of the vehicle may be inserted beneath the separable body when the body is being independently supported on its own legs, lifting mechanism on said main wheel supported frame portion including a movable auxiliary frame which is movable into lifting engagement with said separable body to transfer the support of the latter from its own legs to said auxiliary frame, said legs being then movable out of body supporting position to permit retraction of said lifting mechanism and lowering of said separable body, and means on the main wheel supported frame portion of the vehicle for supporting said auxiliary frame and separable body after the lifting mechanism has been retracted.

21. In a wheeled vehicle having a main rearwardly projecting wheel supported frame portion, a separable body, legs movably connected to said separable body for movement into and out of body supporting position and of such length that the rearwardly projecting wheel supported frame portion of the vehicle may be inserted beneath the separable body when the body is being independently supported on its own legs, lifting mechanism on said main wheel supported frame portion including a movable auxiliary frame which is movable into lifting engagement with said separable body to transfer the support of the latter from its own legs to said auxiliary frame, means including an electric motor on the separable body for moving said legs out of body supporting position to permit retraction of said lifting mechanism and lowering of said separable body, and means on the main wheel supported frame portion of the vehicle for supporting said auxiliary frame and separable body after the lifting mechanism has been retracted.

22. In a wheeled vehicle having a main rearwardly projecting wheel supported frame portion, a separable body, legs movably connected to said separable body for movement into and out of body supporting position and of such length that the rearwardly projecting wheel supported frame portion of the vehicle may be inserted beneath the separable body when the body is being independently supported on its own legs, lifting mechanism on said main wheel supported frame portion including a movable auxiliary frame which is movable into lifting engagement with said separable body to transfer the support of the latter from its own legs to said auxiliary frame, means including an electric motor on the separable body for moving said legs out of body supporting position to permit retraction of said lifting mechanism and lowering of said separable body, means on the main wheel supported frame portion of the vehicle for supporting said auxiliary frame and separable body after the lifting mechanism has been retracted, and means for controlling the operation of said electric motor from the main vehicle.

NORMAN V. KUEHLMAN.
HENRY C. FRENCH.